United States Patent
Seo et al.

(10) Patent No.: US 9,067,229 B2
(45) Date of Patent: Jun. 30, 2015

(54) ACTIVE MATERIAL COATING APPARATUS AND COATING METHOD USING THE SAME

(75) Inventors: Won-Sub Seo, Yongin-si (KR); Jee-Sang Hwang, Yongin-si (KR); Kyoung-Heon Heo, Yongin-si (KR); Gi-Sung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 393 days.

(21) Appl. No.: 12/912,259

(22) Filed: Oct. 26, 2010

(65) Prior Publication Data

US 2011/0287171 A1 Nov. 24, 2011

(30) Foreign Application Priority Data

May 24, 2010 (KR) ........................ 10-2010-0048114

(51) Int. Cl.
*B05C 5/02* (2006.01)
*B29C 47/16* (2006.01)
(Continued)

(52) U.S. Cl.
CPC .............. *B05C 5/0262* (2013.01); *B05C 5/0245* (2013.01); *B05D 1/265* (2013.01); *B29C 47/92* (2013.01); *B05C 5/0254* (2013.01); *B29C 47/165* (2013.01); *B05C 5/0266* (2013.01)

(58) Field of Classification Search
USPC .......... 118/410, 419, 413, 411, 708; 425/461, 425/466, 467, 141, 190
See application file for complete search history.

(56) References Cited

U.S. PATENT DOCUMENTS 4,476,165 A * 10/1984 McIntyre ....................... 118/411
4,911,868 A 3/1990 Reifenhäuser et al.
(Continued)

FOREIGN PATENT DOCUMENTS

CN 101298070 A 11/2008
JP 11-221512 8/1999
(Continued)

OTHER PUBLICATIONS

Office Action dated Mar. 12, 2013 for corresponding JP Application No. 2010-245155.
(Continued)

*Primary Examiner* — Dah-Wei D Yuan
*Assistant Examiner* — Binu Thomas
(74) *Attorney, Agent, or Firm* — Knobbe Martens Olson & Bear LLP

(57) ABSTRACT

The present invention provides an active material coating apparatus to form an active material layer having a uniform thickness in a width direction of a substrate when forming the active material layer on a substrate.
An active material coating apparatus according to an exemplary embodiment of the present invention includes a lower die having a groove for supplying an active material of a slurry state and forming a first lip portion of an outlet slot connected to the groove and outputting the active material; an upper die disposed on an upper side of the lower die to face the first lip portion, having a second lip portion of the outlet slot, and having a hinge portion at the rear of the second lip portion according to the outlet direction of the active material; a fixing spacer interposed between the lower die and the upper die at the rear of the hinge portion according to the outlet direction of the active material and determining a fixing gap; a flexible spacer interposed between the first lip portion and the second lip portion on both sides of the width direction of the outlet slot and forming a variable gap; and a controller installed to the upper die and pushing/pulling the second lip portion with respect to the hinge portion to control the variable gap between the first lip portion and the second lip portion.

16 Claims, 9 Drawing Sheets

(51) Int. Cl.
　　*B05D 1/26*　　(2006.01)
　　*B29C 47/92*　　(2006.01)

(56) References Cited

U.S. PATENT DOCUMENTS

| | | | |
|---|---|---|---|
| 5,208,047 | A | 5/1993 | Cloeren et al. |
| 5,259,747 | A | 11/1993 | Cloeren |
| 6,146,730 | A * | 11/2000 | Lewis et al. ............ 425/472 |
| 6,159,544 | A * | 12/2000 | Liu et al. ............ 118/407 |
| 6,199,301 | B1 * | 3/2001 | Wallace ............ 34/623 |
| 6,344,088 | B1 * | 2/2002 | Kamikihara et al. ......... 118/411 |
| 6,813,820 | B2 * | 11/2004 | Nelson et al. ............ 118/406 |
| 8,123,511 | B2 | 2/2012 | Cloeren et al. |
| 2003/0116881 | A1 | 6/2003 | Nelson et al. |
| 2004/0265407 | A1 * | 12/2004 | Prugh et al. ............ 425/133.5 |
| 2008/0274222 | A1 * | 11/2008 | Cloeren ............ 425/133.5 |

FOREIGN PATENT DOCUMENTS

| | | |
|---|---|---|
| JP | 2004-063423 | 2/2004 |
| JP | 2004-081989 | 3/2004 |
| JP | 2004-249261 | 9/2004 |
| JP | 2005-516796 | 9/2005 |
| JP | 2006-122884 | 5/2006 |
| JP | 2006122884 A * | 5/2006 |
| JP | 2006-175415 | 7/2006 |
| JP | 2006-255643 | 9/2006 |
| JP | 2007-190682 | 8/2007 |
| JP | 2008-036624 | 2/2008 |
| JP | 2008-218079 | 9/2008 |
| JP | 2010-086811 | 4/2010 |
| KR | 1993-0021324 | 11/1993 |
| KR | 10-0858889 | 9/2008 |
| KR | 10-20090080361 | 7/2009 |

OTHER PUBLICATIONS

Office Action dated May 6, 2013 for corresponding CN Application No. 201010569902.9.
Office Action dated Dec. 31, 2013 for corresponding CN Application No. 201010569902.9.
Decision of Rejection issued on Jul. 24, 2014 for Chinese Patent Application No. 201010569902.9.

* cited by examiner

ACTIVE MATERIAL COATING APPARATUS AND COATING METHOD USING THE SAME

CROSS-REFERENCE TO RELATED APPLICATION

This application claims priority to and the benefit of Korean Patent Application No. 10-2010-0048114 filed in the Korean Intellectual Property Office on May 24, 2010, the entire contents of which are incorporated herein by reference.

BACKGROUND OF THE INVENTION

1. Field of the Invention

The present invention relates to an active material coating apparatus to form an active material layer on a substrate formed with an electrode plate of a rechargeable battery, and a coating method using the same.

2. Description of the Related Art

A rechargeable battery includes an electrode plate of which an active material layer is formed on a current collector. In the rechargeable battery, ions emitted from a positive active material layer are moved into a cathode active material layer and are stored during charging, and the ions stored in the cathode active material layer are again returned to the positive active material layer during discharging. It is preferred for these positive and negative active material layers to have a uniform thickness on the current collector to obtain a more uniform characteristic of the rechargeable battery. For this purpose, an active material coating apparatus is used.

As an example, the active material coating apparatus includes an upper die and a lower die forming an outlet slot, a spacer interposed between the upper die and the lower die, and a controller controlling a gap between the upper die and the lower die.

The active material coating apparatus outputs the active material in a slurry state through the outlet slot formed on a front end of the upper die and the lower die The active material is then coated on substrates that are separated by a minute interval and proceed at the front side of the outlet slot.

However, if the gap between the upper die and the lower die is uniformly maintained by the spacer and the controller, the active material coating apparatus may non-uniformly form the thickness of the active material layer coated on the substrate in the width direction. This may be the result of a limitation of the processing accuracy for the upper die and the lower die or as a result of a material property change of the active material slurry.

Also, the active material coating apparatus includes the spacers that are formed with the same material between the upper die and the lower die. The edge portion of the spacers at the both ends of the outlet slot is raised, which increases the thickness of the active material layer. This may result in more non-uniform thicknesses of the active material on both outer ends of the width of the substrate.

As described above, when the thickness of the active material layer formed on the substrate is non-uniform in the length direction, the electrode plate forms a portion having different performance in a unit cell. Also, when the thickness of the active material layer formed on the substrate is non-uniform in the width direction, a plurality of electrode plates forming a rechargeable battery may have different performances, and the performance uniformity of the battery may be deteriorated.

The above information disclosed in this Background section is only for enhancement of understanding of the background of the invention and therefore it may contain information that does not form the prior art that is already known to a person of ordinary skill in the art.

SUMMARY OF THE INVENTION

The present invention provides an active material coating apparatus and a coating method using the same that are capable of forming a uniform thickness of an active material layer in the width direction of the substrate when forming the active material layer on the substrate.

An active material coating apparatus according to an exemplary embodiment of the present invention includes: a lower die having a groove for supplying an active material of a slurry state wherein the lower die forms a first lip portion of an outlet slot connected to the groove which outputs the active material; an upper die disposed on an upper side of the lower die to face the first lip portion, wherein the upper die has a second lip portion of the outlet slot, and further has a hinge portion at the rear of the second lip portion according to the outlet direction of the active material; a fixing spacer interposed between the lower die and the upper die at the rear of the hinge portion according to the outlet direction of the active material and wherein the fixing spacer determines a fixing gap; a flexible spacer interposed between the first lip portion and the second lip portion on both sides of the width direction of the outlet slot and forming a variable gap; and a controller installed to the upper die and moving the second lip portion with respect to the hinge portion to control the variable gap between the first lip portion and the second lip portion.

The fixing spacer may be formed of steel, and may include a main body disposed according to the width direction of the outlet slot at the rear of the groove and a pair of branch portions extended in the outlet direction of the active material on both sides of the main body and wherein the branch portions provide a first determination of the width of the outlet slot.

The flexible spacer may be supported by the front end of the branch portion for the outlet direction of the active material, and may be controlled in the width direction of the outlet slot to provide a second determination of the width of the outlet slot.

The flexible spacer may include a guide hole elongated in the width direction of the outlet slot, and the first lip portion may include a guide pin inserted in the guide hole.

The flexible spacer may be formed of a single-layered structure of one of synthetic resin and synthetic rubber.

The flexible spacer may be formed of a multi-layered structure including a synthetic resin layer and a steel layer that are alternately disposed.

The flexible spacer may include a shim made of steel, and a flexible layer made of synthetic rubber, synthetic resin, or silicone, and covering the shim.

The flexible spacer may include a shim made of steel, a flexible layer made of synthetic rubber or silicone and covering the shim, and a lower friction layer made of PTFE and covering the flexible layer.

An active material coating method according to an exemplary embodiment of the present invention includes: determining a fixing gap between a lower die and an upper die through a fixing spacer as a first step; determining a width of an outlet slot by a first lip portion of the lower die and a second lip portion of the upper die through a flexible spacer as a second step; moving the second lip portion with respect to the hinge portion through a controller to control the variable gap between the first lip portion and the second lip portion as a third step; and outputting an active material of a slurry state through an outlet slot that is controlled with the width of the variable gap to coat the active material layer on a proceeding substrate at the front end of the outlet slot.

According to an exemplary embodiment of the present invention, a fixing gap between a lower die and an upper die is determined through a fixing spacer, and a flexible spacer is interposed between the first lip portion of the lower die and the second lip portion of the upper die to control a variable gap through a controller, when coating an active material on a substrate through an outlet slot, in spite of a limitation of processing accuracy or a change of the matter property of the active material slurry, such that the thickness of the active material layer is uniform in the width direction of the substrate.

Also, the flexible spacer prevents the edge portion from being raised on both ends of the width direction of the outlet slot such that the thickness of the active material layer may be further uniform on both ends of the width direction of the substrate.

DETAILED DESCRIPTION OF THE EMBODIMENTS

Figure 1:
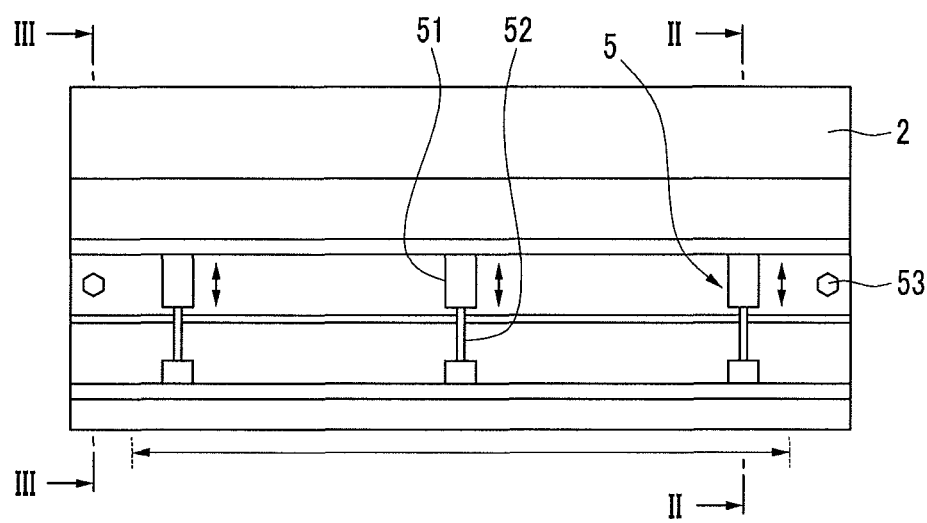
FIG. 1 is a top plan view of an active material coating apparatus according to an exemplary embodiment of the present invention.
Figure 1:
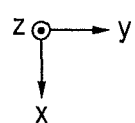

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
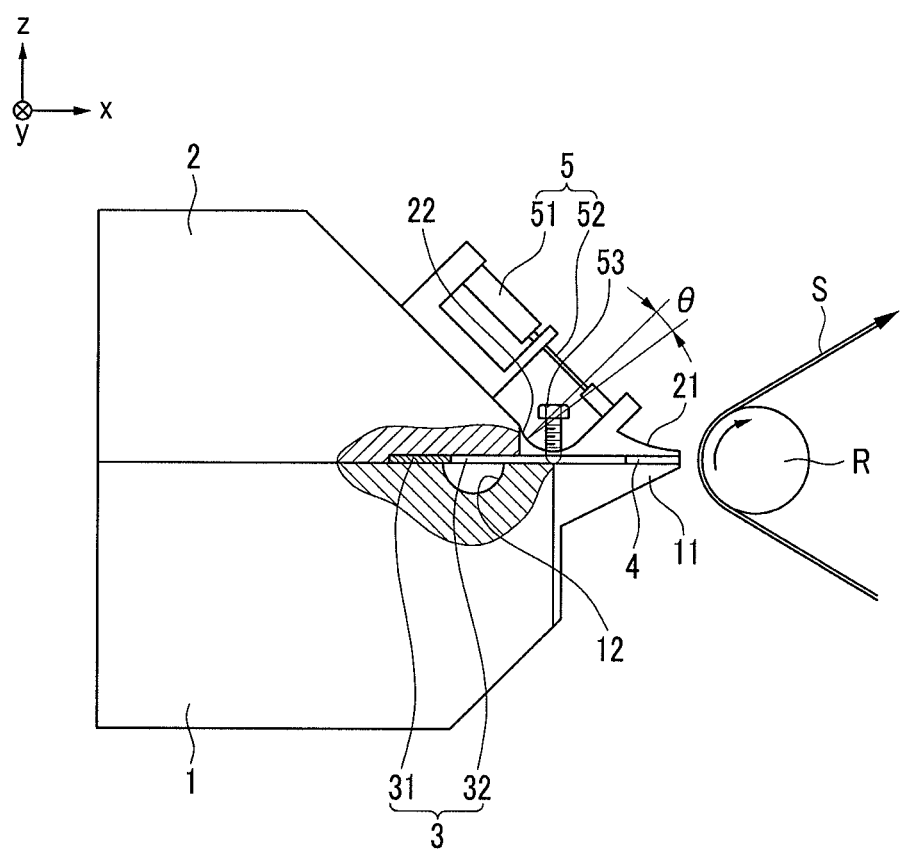
FIG. 2 is a cross-sectional view taken along the line II-II of FIG. 1.
Figure 3:
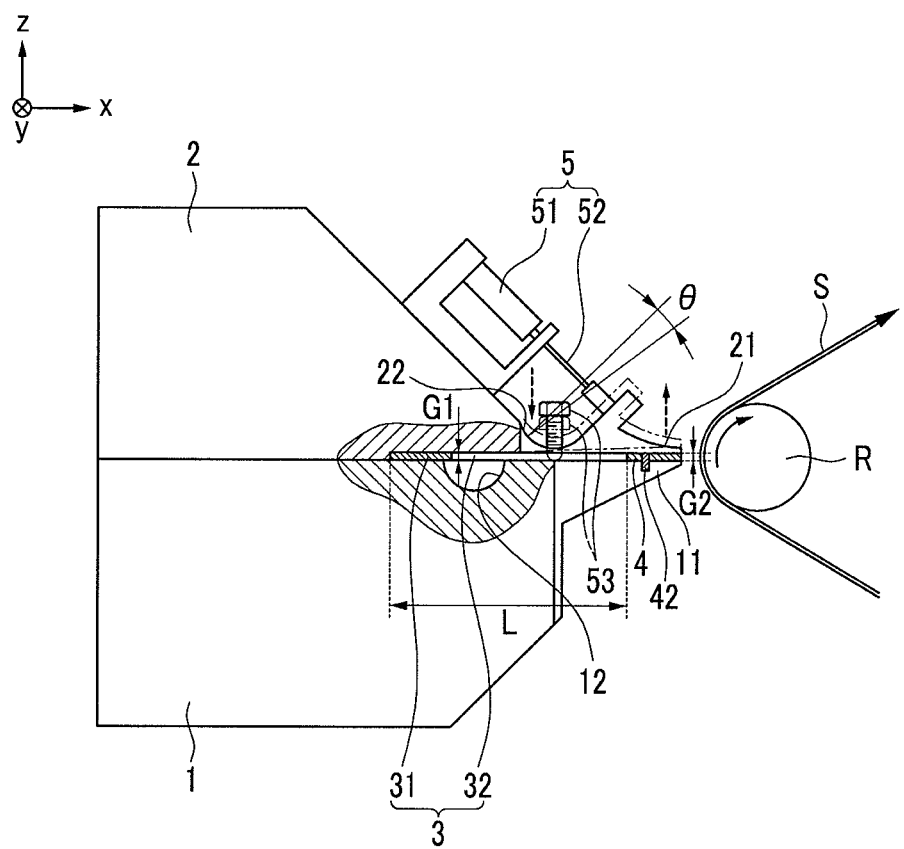
FIG. 3 is a cross-sectional view taken along the line III-III of FIG. 1.

FIG. 1 is a top plan view of an active material coating apparatus according to an exemplary embodiment of the present invention, FIG. 2 is a cross-sectional view taken along the line II-II of FIG. 1, and FIG. 3 is a cross-sectional view taken along the line III-III of FIG. 1. Referring to FIG. 1 to FIG. 3, an active material coating apparatus according to an exemplary embodiment includes a lower die 1, an upper die 2, a fixing spacer 3, a flexible spacer 4, and a controller 5 to coat the active material supplied in a slurry state on a substrate S with a uniform thickness. The substrate S may be made of an aluminum sheet forming a current collector.

If the substrate S coated with the active material is cut to a predetermined size, it forms an electrode plate of a positive electrode or a cathode of a unit cell of a rechargeable battery. That is, the substrate S coated with the active material includes a plurality of electrode plates.

Figure 4:
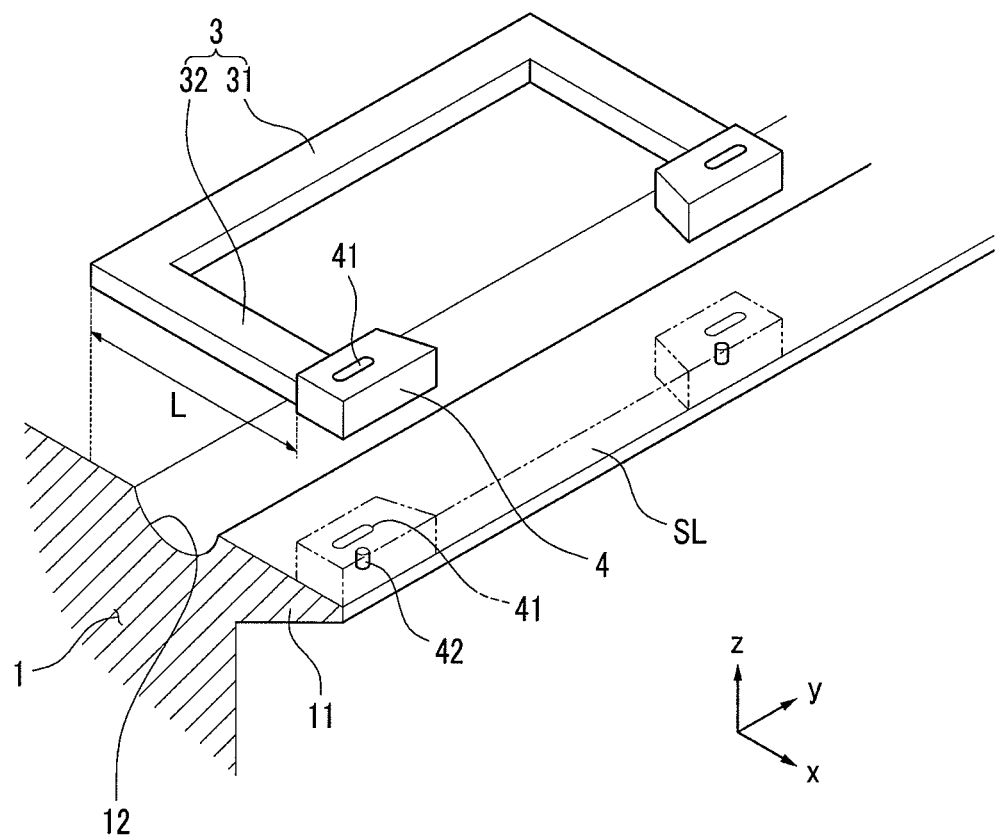
FIG. 4 is an exploded perspective view of a lower die and a spacer separated from the upper die in FIG. 2.

The lower die 1 and the upper die 2 overlap and are combined in an-up-and down direction (z-axis direction), the fixing spacer 3 and the flexible spacer 4 are interposed therebetween, and an outlet slot SL to output the active material is formed on one side (as shown in FIG. 4).

The lower die 1 includes a groove 12 supplying the active material in the slurry state to the outlet slot SL. The groove 12 is elongated in the width W direction (y-axis direction) of the outlet slot SL on the upper surface of the lower die 1 such that it is formed throughout the whole width W. Accordingly, the outlet slot SL may uniformly output the active material supplied to the groove 12 to the whole width W.

The lower die 1 includes a first lip portion 11 formed on the front end according to the outlet direction (x-axis direction) of the active material, and the upper die 2 includes a second lip portion 21 formed on the front end according to the outlet direction (x-axis direction) of the active material and facing the first lip portion 11. The upper die 2 has a hinge portion 22 formed on the rear of the x-axis direction of the second lip portion 21. The hinge portion 22 may control the position of the z-axis direction of the second lip portion 21 by fixing the position of the upper die 2.

The fixing spacer 3 is interposed between the lower die 1 and the upper die 2 on the rear of the hinge portion 22 with reference to the outlet direction (x-axis direction) of the active material, thereby determining the fixing gap G1 between the lower die 1 and the upper die 2 (referring to FIG. 4). For example, the fixing spacer 3 is made of steel having a plate shape, and the thickness thereof determines the fixing gap G1. A variable gap G2 may be controlled in a range in which the active material does not leak. That is, the variable gap G2 may be controlled and made wider or narrower than the fixing gap G1 so that the outlet thickness of the active material is more uniform throughout the whole width W direction (y-axis direction) of the substrate S.

Figure 5:
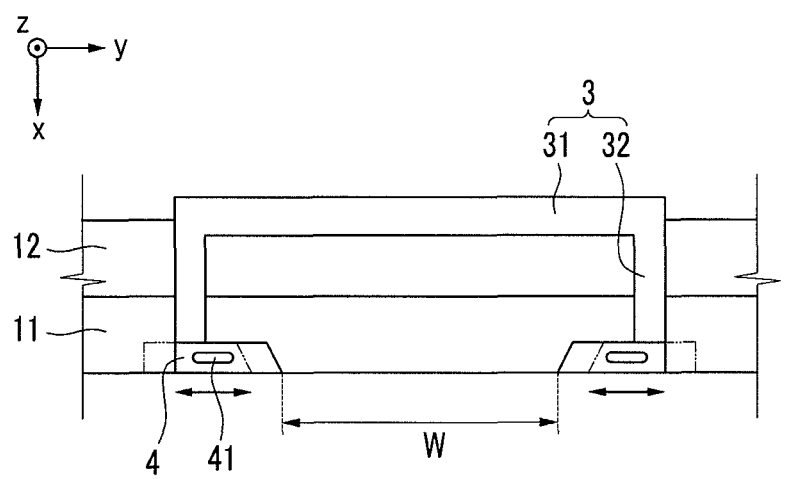
FIG. 5 is a top plan view of FIG. 4.

FIG. 4 is an exploded perspective view of a lower die and a spacer separated from the upper die in FIG. 2, and FIG. 5 is a top plan view of FIG. 4. Referring to FIG. 4 and FIG. 5, the fixing spacer 3 includes a main body 31 and a pair of branch portions 32, and they are formed with the same thickness. The main body 31 is formed with a plate shape, and is disposed according to the width W direction (y-axis direction) of the outlet slot SL on the rear of the groove 12. A plurality of branch portions 32 are formed with a plate shape and extended in the outlet direction (x-axis direction) of the active material on both sides of the main body 31, and thereby the width W of the outlet slot SL as the interval therebetween is first determined by the width of the arms 32.

The fixing gap G1 is determined in the range L where the main body 31 and the branch portion 32 of the fixing spacer 3 exist between the lower die 1 and the upper die 2. The branch portion 32 transverses the groove 12 such that this region L includes the region from the main body 31 to the front of the groove 12. In this case, the branch portion 32 does not prevent the active material from being supplied through the groove 12.

The flexible spacer 4 is interposed between the first lip portion 11 and the second lip portion 21 on both sides of the width W direction (y-axis direction) of the outlet slot SL. Thus, the variable gap G2 between the first lip portion 11 and the second lip portion 21 in the z-axis direction and the width W of the outlet slot SL in the y-axis direction may be controlled.

The width W of the outlet slot SL is firstly determined by the fixing spacer 3, that is, a pair of branch portions 32, and is finally determined by the position of the y-axis direction of a pair of flexible spacers 4 interposed between the first lip portion 11 and the second lip portion 21. That is, the width W of the outlet slot SL is the distance between a pair of flexible spacers 4 in the y-axis direction.

The flexible spacer 4 is supported by the front end of the branch portion 32 for the x-axis direction. The position of the flexible spacer 4 is thus, controlled in the width W direction (y-axis direction) of the outlet slot SL thereby providing a second level of control of the width of the outlet slot SL.

More specifically, the upper die 2 includes an adjusting screw 53. The adjusting screw 53 is screw-coupled to the hinge portion 22 to be controlled in the clockwise direction or the counterclockwise direction, wherein the upper die 2 is assembled to the lower die 1. The second lip portion 21 is moved in the z-axis direction with respect to the first lip portion 11 such that the position control of the y-axis direction of the flexible spacer 4 is possible between the first lip portion 11 and the second lip portion 21.

For example, if the adjusting screw 53 is rotated in the clockwise direction, the adjusting screw 53 is decreased in the hinge portion 22 and presses the lower die 1 to the front end thereof, and finally, draws up the second lip portion 21 of the upper die 2. In this way, the position of the y-axis direction of the flexible spacer 4 is controlled. Also, if the adjusting screw 53 is rotated in the counterclockwise direction, the adjusting screw 53 in the hinge portion 22 and the force pressing the lower die 1 to the front end thereof is increased, resulting in the second lip portion 21 of the upper die 2 being drawn down.

The flexible spacer 4 is moved in the y-axis direction in the front end of the branch portion 32, thereby being supported in the x-axis direction. Also, the flexible spacer 4 may further include a guide hole 41 that is elongated in the width W direction (y-axis direction) of the outlet slot SL. Here, the first lip portion 11 includes a guide pin 42 inserted in the guide hole 41 such that the movement of the y-axis direction of the flexible spacer 4 may be further correctly guided.

Figure 6:
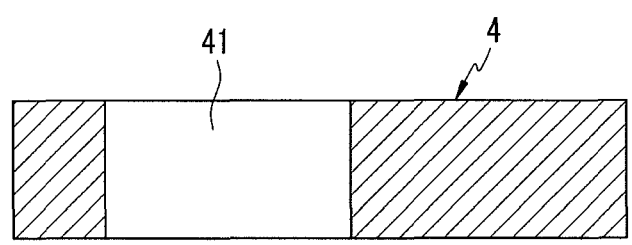
FIG. 6 is a cross-sectional view of a flexible spacer according to the first exemplary embodiment.

FIG. 6 is a cross-sectional view of a flexible spacer according to the first exemplary embodiment. The flexible spacer 4 may be formed of various materials and structures to form the variable gap G2. Referring to FIG. 6, the flexible spacer 4 may be formed with a single-layered structured using a synthetic resin or synthetic rubber. For example, the synthetic rubber may be Ethylene Propylene Diene Monomer (EPDM) having flexibility, and the synthetic resin may be polytetrafluoroethylene (PTFE) having a low friction property (often sold under the trademark "Teflon").

Further, the controller 5 is installed to the upper die 2 and pushes/pulls the second lip portion 21 with respect to the hinge portion 22 to control the variable gap G2. The controller 5 may be variously configured, and the present exemplary embodiment provides a cylinder configuration. In the controller 5, a cylinder 51 is installed to the upper die 2, and a shaft 52 is connected to the second lip portion 21.

If the shaft 52 is extended (a solid line of FIG. 3) or retracted (a dashed line of FIG. 3) by the driving of the cylinder 51, the second lip portion 21 is rotated by an angle θ with respect to the hinge portion 22 such that the variable gap G2 is controlled and determined. A plurality of controllers 5 may be provided according to the size of the width W of the outlet slot SL, and the present exemplary embodiment provides three cylinder 51 that are disposed at equal intervals. The plurality of cylinders 51 may uniformly control and form the variable gap G2 throughout the whole range of the width W of the outlet slot SL.

Figure 7:
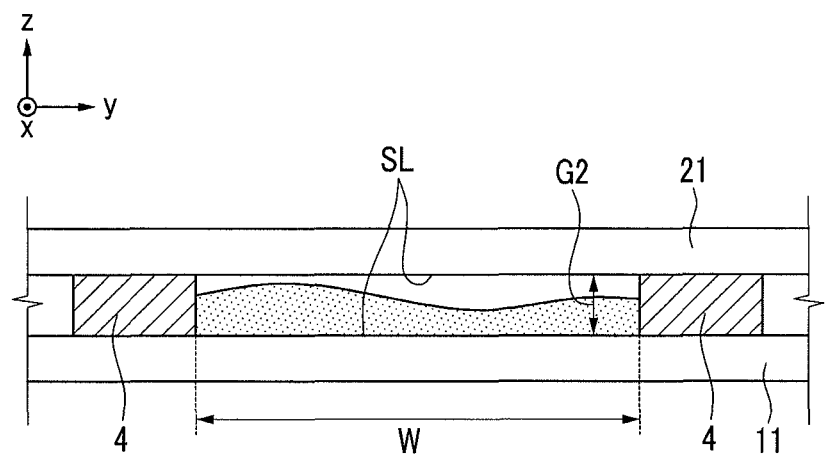
FIG. 7 is a state view forming a non-uniform thickness of an active material slurry in an outlet slot in a width direction of an outlet slot.
Figure 8:
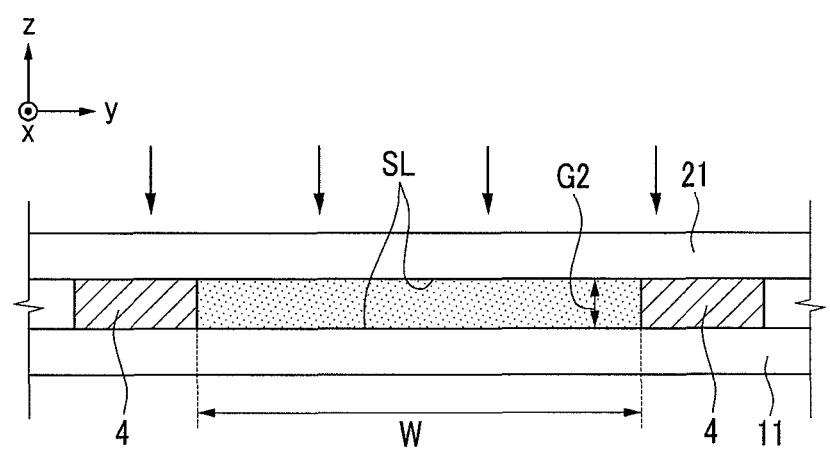
FIG. 8 is a state view forming a uniform thickness of an active material slurry in an outlet slot in a width direction of an outlet slot.

FIG. 7 is a state view of forming a non-uniform thickness of an active material slurry in the outlet slot in a width direction of the outlet slot. FIG. 8 is a state view of forming a uniform thickness of an active material slurry in the outlet slot in a width direction of the outlet slot.

The second lip portion 21 controls the variable gap G2 from the state of FIG. 7 to the state of FIG. 8 in the outlet slot SL, and the active material is formed with the uniform thickness that is substantially the same thickness as the variable gap G2 in the y-axis direction, and is output in this state. In this way, the processing accuracy and operation of the cylinder 51 can control the variable gap G2 to account for matter change in the slurry.

The active material output through the controlled variable gap G2 is coated on the substrate S that proceeds while being maintained at a minute interval in the front of the x-axis direction of the outlet slot SL. The substrate S moves downward by the rotation of the roll R and proceeds upward after passing the roll R.

Figure 9:
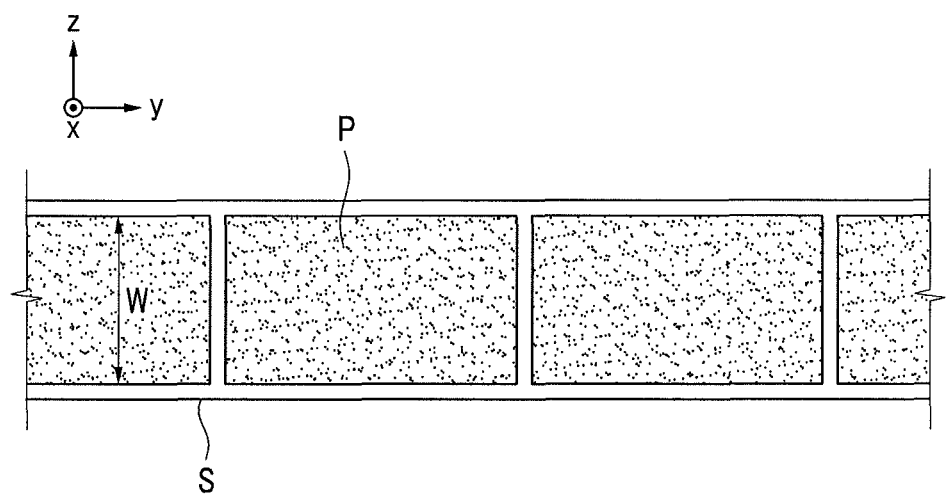
FIG. 9 is a top plan view of a state in which an active material layer is formed on a substrate by using the active material coating apparatus of FIG. 1.

FIG. 9 is a top plan view of a state in which an active material layer is formed on a substrate by using the active material coating apparatus of FIG. 1. Referring to FIG. 9, the substrate S is formed with an aluminum sheet having a predetermined width, and is continuously supplied in the length direction of the substrate S by the roll R and is coated in a predetermined length. That is, the active material layer is coated as a pattern P in the length direction on the substrate S. Also, the substrate S is divided in the width W direction (y-axis direction) for each pattern P and is cut in the length direction (x-axis direction) to form a plurality of electrode plates.

Here, the thickness of the active material layer formed on the substrate S is more uniform in the length direction of the substrate S such that the cut electrode plate does not have a difference in performance for each position in the unit cell. Also, the thickness of the active material layer formed on the substrate S is more uniform in the width W direction (y-axis direction) of the substrate S such that the plurality of electrode plates form rechargeable batteries having more similar performance characteristics, and thereby the performance uniformity may be improved.

Figure 10:
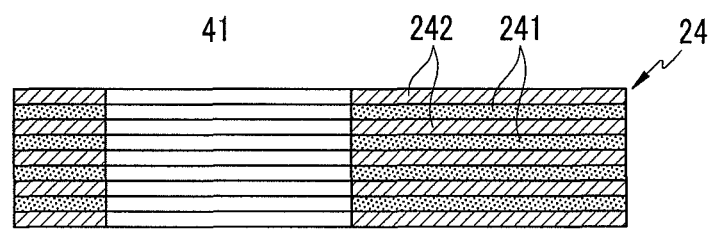
FIG. 10 is a cross-sectional view of a flexible spacer according to the second exemplary embodiment.

FIG. 10 is a cross-sectional view of a flexible spacer according to the second exemplary embodiment. Referring to FIG. 10, the flexible spacer 24 is different than the flexible spacer 4 of the single-layered structure of the first exemplary embodiment in that the flexible spacer 24 of the second exemplary embodiment is formed of a multi-layered structure.

The flexible spacer 24 of the second exemplary embodiment has the multi-layered structure including a synthetic resin layer 241 and a steel layer 242 that are alternately disposed. The synthetic resin layer 241 may be formed of polytetrafluoroethylene (PTFE). The flexibility of the synthetic resin layer 241 can be used to form the variable gap G2, and the steel layer 342 may securely maintain the predetermined variable gap G2.

Figure 11:
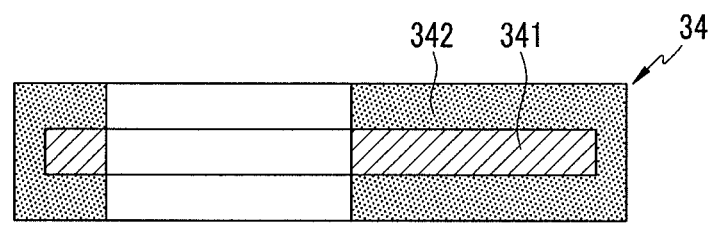
FIG. 11 is a cross-sectional view of a flexible spacer according to the third exemplary embodiment.

FIG. 11 is a cross-sectional view of a flexible spacer according to the third exemplary embodiment. Referring to FIG. 11, differently from the flexible spacer 24 having the simple multi-layered structure of the second exemplary embodiment, the flexible spacer 34 of the third exemplary embodiment includes a shim 341 made of steel and a flexible layer 342 made of synthetic rubber, synthetic resin, or silicone, which covers the shim 341.

The flexible spacer 34 of the third exemplary embodiment may more securely maintain the variable gap G2 through the shim 341. The flexible layer 342 can be used to form the variable gap G2, and the outlet resistance of the active material is reduced, and thereby making it possible to coat the substrate with more uniform thickness.

Figure 12:
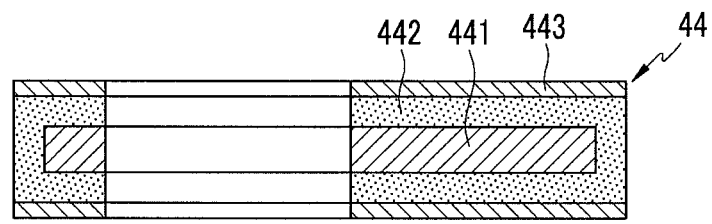
FIG. 12 is a cross-sectional view of a flexible spacer according to the fourth exemplary embodiment.

FIG. 12 is a cross-sectional view of a flexible spacer according to the fourth exemplary embodiment. Referring to FIG. 12, different from the third exemplary embodiment including the flexible spacer 34 having the shim 341 and the flexible layer 342, the flexible spacer 44 according to the fourth exemplary embodiment includes a shim 441 made of steel, a flexible layer 442 made of synthetic rubber or silicone and covering the shim 441, and a lower friction layer 443 made of PTFE which covers the flexible layer 442.

In the flexible spacer 44 of the fourth exemplary embodiment, the shim 441 may securely maintain the variable gap G2, the flexible layer 442 and the lower friction layer 443 can be used to form the variable gap G2, and the lower friction layer 443 reduces the outlet resistance of the active material This makes coating the substrate to a more uniform thickness possible.

Figure 13:
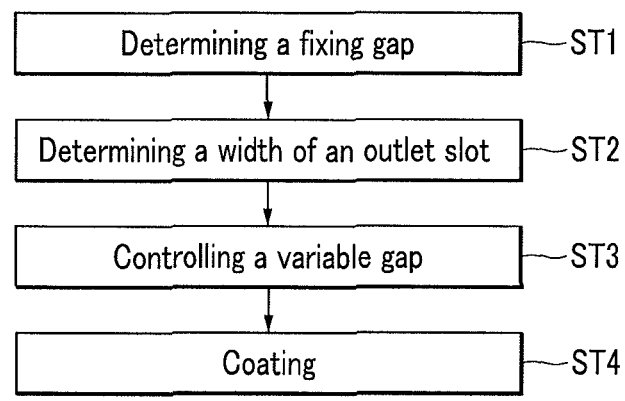
FIG. 13 is a flowchart of a coating method according to an exemplary embodiment of the present invention.

FIG. 13 is a flowchart of a coating method according to an exemplary embodiment of the present invention. Referring to FIG. 13, a coating method according to an exemplary embodiment includes a first step ST1 for determining a fixing gap G1, a second step ST2 for determining the width W of the outlet slot SL, a third step ST3 for controlling the variable gap G2, and a fourth step ST4 for coating.

The first step ST1 determines the fixing gap G1 between the lower die 1 and the upper die 2 through the fixing spacer 3. It is possible to select a fixing spacer 3 having a predetermined thickness.

The second step ST2 determines the width W of the outlet slot SL by the first lip portion 11 of the lower die 1 and the second lip portion 21 of the upper die 2 through the flexible spacer 4. The adjusting screw 53 is rotated in the clockwise direction such that the position of the y-axis direction of the flexible spacer 4 is determined between the first lip portion 11 and the second lip portion 21, and the adjusting screw 53 is rotated in the counterclockwise direction to fix the flexible spacer 4, thereby completing the determination of the width W of the outlet slot SL.

The third step ST3 pushes/pulls the second lip portion 21 with respect to the hinge portion 22 through the controller 5 such that the variable gap G2 is controlled between the first lip portion 11 and the second lip portion 21 (referring to FIG. 3). The control of the variable gap G2 is completed from the state of FIG. 7 to the state of FIG. 8.

The fourth step ST4 outputs the active material through the outlet slot SL that is controlled with the width W and the variable gap G2 such that the proceeding substrate S at the front end of the outlet slot SL is coated with the active material layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An active material coating apparatus comprising:
   a lower die having a groove for supplying an active material in a slurry state wherein the lower die forms a first lip portion of an outlet slot connected to the groove which outputs the active material;
   an upper die disposed on an upper side of the lower die to face the first lip portion, wherein the upper die has a second lip portion of the outlet slot, and further has a hinge portion at a rear of the second lip portion according to an outlet direction of the active material, the upper die including an adjusting screw that is screw-coupled to the hinge portion to be controlled in a clockwise direction or a counterclockwise direction, wherein the upper die is assembled to the lower die;
   a fixing spacer having a first thickness interposed between the lower die and the upper die at the rear of the hinge portion according to the outlet direction of the active material and wherein the fixing spacer determines a fixing gap;
   a flexible spacer having a second thickness greater than the first thickness supported by an end of the fixing spacer so as to be movable in a width direction of the fixing gap wherein the flexible spacer is interposed between the first lip portion and the second lip portion on both sides of the width direction of the outlet slot and forming a variable gap, wherein the flexible spacer is configured such that rotation of the adjusting screw moves the second lip portion in the z-axis direction with respect to the first lip portion such that a position control of a y-axis direction of the flexible spacer between the first lip portion and the second lip portion is achieved; and
   a controller installed to the upper die and moving the second lip portion with respect to the hinge portion to control the variable gap between the first lip portion and the second lip portion.

2. The active material coating apparatus of claim 1, wherein the fixing spacer is formed of steel, and
   includes a main body disposed according to the width direction of the outlet slot at a rear of the groove, and
   a pair of branch portions extended in the outlet direction of the active material on both sides of the main body and wherein the branch portions provide a first determination of a width of the outlet slot.

3. The active material coating apparatus of claim 2, wherein the flexible spacer is supported by a front end of the branch portion for the outlet direction of the active material, and
   is controlled in the width direction of the outlet slot to provide a second determination of the width of the outlet slot.

4. The active material coating apparatus of claim 2, wherein the flexible spacer
   includes a guide hole elongated in the width direction of the outlet slot, and
   wherein the first lip portion includes a guide pin inserted in the guide hole.

5. The active material coating apparatus of claim 1, wherein the flexible spacer is formed of a single-layered structure of one of synthetic resin and synthetic rubber.

6. The active material coating apparatus of claim 1, wherein the flexible spacer is formed of a multi-layered structure including a synthetic resin layer and a steel layer that are alternately disposed.

7. The active material coating apparatus of claim 1, wherein the flexible spacer includes a shim made of steel, and
a flexible layer made of synthetic rubber, synthetic resin, or silicone, and covering the shim.

8. The active material coating apparatus of claim 1, wherein the flexible spacer includes
a shim made of steel,
a flexible layer made of synthetic rubber or silicone, and covering the shim, and
a lower friction layer made of polytetrafluoroethylene and covering the flexible layer.

9. An apparatus for coating a substrate used in a battery with a battery active material, the apparatus comprising:
a first die that is configured to supply an active material in a slurry state, wherein the first die defines a first lip portion of an outlet slot that receives the active material from the first die and outputs the active material;
a second die that engages with the first die, wherein the second die defines a second lip portion of the outlet slot wherein the first and second dies are movable with respect to each other, the second die including an adjusting screw that is screw-coupled to the hinge portion to be controlled in a clockwise direction or a counterclockwise direction, wherein the second die is assembled to the first die;
a first spacer having a first thickness that is interposed between the first and the second die, wherein the first spacer is positioned a first distance from the outlet slot and defines a first gap of the outlet slot;
a second spacer having a second thickness greater than the first thickness that is supported by an end of the first spacer so as to be movable in a width direction of the first gap interposed between the first and the second die, wherein the second spacer is positioned a second distance, less than the first distance from the outlet slot, wherein the second spacer is flexible such that movement between the first and the second die can result in the first gap of the outlet slot being varied, wherein the second spacer is configured such that rotation of the adjusting screw moves the second lip portion in the z-axis direction with respect to the first lip portion such that a position control of a y-axis direction of the second spacer between the first lip portion and the second lip portion is achieved; and
a controller that induces movement between the first and the second dies so as to vary the first gap of the outlet slot to provide more uniform thickness of the battery active material through the outlet slot.

10. The apparatus of claim 9, wherein the first die includes a groove that supplies the active material in a slurry state to the outlet slot.

11. The apparatus of claim 9, wherein the second die includes a hinged portion that is movable by the controller to control a width of the outlet slot.

12. The apparatus of claim 9, wherein the first spacer is a fixed spacer having a base and two arms that extend in the direction of the outlet slot.

13. The apparatus of claim 12, wherein the second spacer is a flexible spacer that is positioned on the ends of the arms of the first spacer.

14. The apparatus of claim 13, wherein the flexible spacer is movable so as to adjust a width of the outlet slot.

15. The active material coating apparatus of claim 1, wherein an axis of the adjusting screw is perpendicular to the upper side of the lower die.

16. The apparatus of claim 9, wherein an axis of the adjusting screw is perpendicular to a surface of the first die facing a surface of the second die having the second spacer therebetween.

* * * * *